US007190694B2

(12) United States Patent
Sato et al.

(10) Patent No.: US 7,190,694 B2
(45) Date of Patent: *Mar. 13, 2007

(54) COMMUNICATIONS SYSTEM

(75) Inventors: Makoto Sato, Kanagawa (JP); Harumi Kawamura, Tokyo (JP); Yuko Iijima, Kanagawa (JP); Hisato Shima, Chiba (JP)

(73) Assignee: Sony Corporation, Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 10/440,849

(22) Filed: May 19, 2003

(65) Prior Publication Data

US 2004/0022201 A1 Feb. 5, 2004

Related U.S. Application Data

(63) Continuation of application No. 08/738,465, filed on Oct. 24, 1996, now Pat. No. 6,584,099, which is a continuation of application No. 08/354,119, filed on Dec. 6, 1994, now abandoned.

(30) Foreign Application Priority Data

Dec. 10, 1993 (JP) .................................. 5-341748
May 31, 1994 (JP) .................................. 6-141071

(51) Int. Cl.
*H04L 12/28* (2006.01)
(52) U.S. Cl. ..................... 370/359; 370/362; 370/419; 370/489
(58) Field of Classification Search ................ 370/282, 370/359, 362, 363, 364, 365, 419, 420, 421, 370/423, 489
See application file for complete search history.

(56) References Cited

U.S. PATENT DOCUMENTS 4,028,500 A * 6/1977 McClure et al. ............ 455/566

(Continued)

FOREIGN PATENT DOCUMENTS

CA            2 085 959          6/1994

(Continued)

OTHER PUBLICATIONS

European search report dated Sep. 23, 2005, from the European Patent Office.

*Primary Examiner*—Ricky Q. Ngo
*Assistant Examiner*—Shick Hom
(74) *Attorney, Agent, or Firm*—Finnegan, Henderson, Farabow, Garrett & Dunner, L.L.P.

(57) ABSTRACT

A communications system connected via a bus capable of transmitting multiplexed packets of control signals and AV signals while providing an environment, which is the same as an environment where connections are made using analog signal lines. A register with a fixed address is taken to be a virtual plug for each of a plurality of equipment. When the plug enable for the input plug is set to 1, an isochronous communication packet for the AV signal on the channel set by the channel number is received. When the plug enable for the output plug is set to one and the isochronous communication packet for the information signal is sent on the channel, then the channel number is set in the channel number field at a transmission speed designated by the DR (Data Rate) field at the bandwidth presented in the bandwidth field.

6 Claims, 16 Drawing Sheets

U.S. PATENT DOCUMENTS

| | | | |
|---|---|---|---|
| 4,041,462 A * | 8/1977 | Davis et al. | 712/228 |
| 4,337,480 A | 6/1982 | Bourassin et al. | 358/93 |
| 4,450,554 A | 5/1984 | Steensma et al. | 370/4 |
| 4,581,645 A | 4/1986 | Beyers et al. | 358/181 |
| 5,170,252 A | 12/1992 | Gear et al. | 348/659 |
| 5,258,999 A | 11/1993 | Wernimont et al. | 375/7 |
| 5,282,038 A | 1/1994 | Lowe | 348/659 |
| 5,313,454 A | 5/1994 | Bustini et al. | 370/94.2 |
| 5,389,963 A | 2/1995 | Lepley et al. | 725/78 |
| 5,402,419 A | 3/1995 | Orakabe et al. | 370/94.1 |
| 5,414,707 A | 5/1995 | Johnston et al. | 370/94.1 |
| 5,416,906 A | 5/1995 | Mariani | 340/825.07 |
| 5,422,882 A | 6/1995 | Hiller et al. | 370/60.1 |
| 5,425,022 A | 6/1995 | Clark et al. | 370/85.1 |
| 5,434,981 A | 7/1995 | Lenihan et al. | 370/85.1 |
| 5,448,562 A | 9/1995 | Osakabe et al. | 370/392 |
| 5,455,619 A | 10/1995 | Truckenmiller et al. | 725/78 |
| 5,608,730 A | 3/1997 | Osakabe et al. | 370/471 |
| 5,621,456 A | 4/1997 | Florin et al. | 348/7 |
| 5,805,073 A * | 9/1998 | Nagano et al. | 340/3.53 |
| 5,883,677 A | 3/1999 | Hofmann | 725/59 |
| 5,894,320 A | 4/1999 | Vancelette | 725/59 |

FOREIGN PATENT DOCUMENTS

| | | |
|---|---|---|
| EP | 0 015 797 | 9/1980 |
| EP | 0 604 166 B1 | 6/1994 |
| EP | 0 604 167 B1 | 6/1994 |
| EP | 0 608 624 B1 | 8/1994 |
| EP | 0 610 630 B1 | 8/1994 |
| WO | WO 93/00752 | 1/1993 |

* cited by examiner

CSP : Cycle start packet

FIG.5

| Bit coding b9 b8 b7 b6 b5 b4 b3 b2 b1 b0 | sub-device number /category type | |
|---|---|---|
| 0 0 1 0 0 0 0 0 0 0 | number | VTR Deck 1 |
| 0 0 1 0 0 0 0 0 0 1 | | VTR Deck 2 |
| 0 0 1 0 0 0 0 0 1 0 | | VTR Deck 3 |
| : | | : |
| 0 0 1 0 0 0 0 1 1 0 | | VTR Deck 7 |
| 0 0 1 0 0 0 1 0 0 0 | Category Type | VHS/S-VHS |
| 0 0 1 0 0 0 1 0 0 1 | | 8 mm/Hi8 |
| 0 0 1 0 0 0 1 0 1 0 | | Beta/ED-Beta |
| 0 0 1 0 0 0 1 0 1 1 | | VHS-C/S-VHS-C |
| 0 0 1 0 0 0 1 1 0 0 | | Digital VTR |
| 0 0 1 0 0 0 1 1 0 1 | | W-VHS |
| 0 0 1 0 0 0 1 1 1 0 | | Reserved |
| : | | : |
| 0 0 1 0 0 1 1 1 1 0 | | Reserved |
| 0 0 1 0 0 1 1 1 1 1 | | Any VTR |

FIG.6

| examples of categories which actually correspond to sub-device numbers |
|---|
| VHS/S-VHS |
| 8 mm/Hi8 |
| No existence |
| : |
| No existence |

FIG. 7

| Bit coding b9 b8 b7 b6 b5 b4 b3 b2 b1 b0 | plug number / category type | |
|---|---|---|
| 0 0 0 0 0 0 0 0 0 0 | plug number | plug 1 |
| 0 0 0 0 0 0 0 0 0 1 | | plug 2 |
| 0 0 0 0 0 0 0 0 1 0 | | plug 3 |
| ⋮ | | ⋮ |
| 0 0 0 0 1 1 1 1 1 1 | | plug 64 |
| 0 0 0 1 0 0 0 0 0 0 | | digital bus ch 1 |
| 0 0 0 1 0 0 0 0 0 1 | | digital bus ch 2 |
| 0 0 0 1 0 0 0 0 1 0 | | digital bus ch 3 |
| ⋮ | | ⋮ |
| 0 0 0 1 1 1 1 1 1 1 | | digital bus ch 64 |
| 0 0 1 0 0 0 0 0 0 0 | category type | monitor |
| 0 0 1 0 0 0 0 0 0 1 | | audio amplifier |
| 0 0 1 0 0 0 0 0 1 0 | | Reserved |
| 0 0 1 0 0 0 0 0 1 1 | | Reserved |
| 0 0 1 0 0 0 0 1 0 0 | | VTR |
| 0 0 1 0 0 0 0 1 0 1 | | tuner |
| 0 0 1 0 0 0 0 1 1 0 | | MDP |
| 0 0 1 0 0 0 0 1 1 1 | | camera |
| 0 0 1 0 0 0 1 0 0 0 | | teletext |
| 0 0 1 0 0 0 1 0 0 1 | | video text |
| 0 0 1 0 0 0 1 0 1 0 | | video printer |
| 0 0 1 0 0 0 1 0 1 1 | | FAX |
| 0 0 1 0 0 0 1 1 0 0 | | video effects unit |
| ⋮ | | ⋮ |
| 0 0 1 0 0 1 1 1 1 1 | | Reserved |
| 0 0 1 0 1 0 0 0 0 0 | | analog line input/output |
| 0 0 1 0 1 0 0 0 0 1 | | digital line input/output |
| 0 0 1 0 1 0 0 0 1 0 | | digital bus ch ? |
| ⋮ | | ⋮ |
| 1 1 1 1 1 1 1 1 1 1 | | Reserved |

FIG.8

| Examples of categories/addresses which actually correspond to plug numbers. ||
|---|---|
| input | output |
| analog line input<br>analog line input<br>No existence<br>:<br>No existence | monitor<br>analog line output<br>digital line output<br>:<br>No existence |
| The channel to be used for input/output is decided actively by the command.<br>The address of the opposing item which the conection is being made to is therefore held (in the case of output, there may be many itmes). ||

FIG.9

| Examples of categories/addresses which actually correspond to plug numbers. ||
|---|---|
| input | output |
| Camera<br>CD<br>No existence<br>:<br>No existence | monitor<br>video printer<br>audio deck<br>:<br>No existence |
|  | TV, VTR2 |

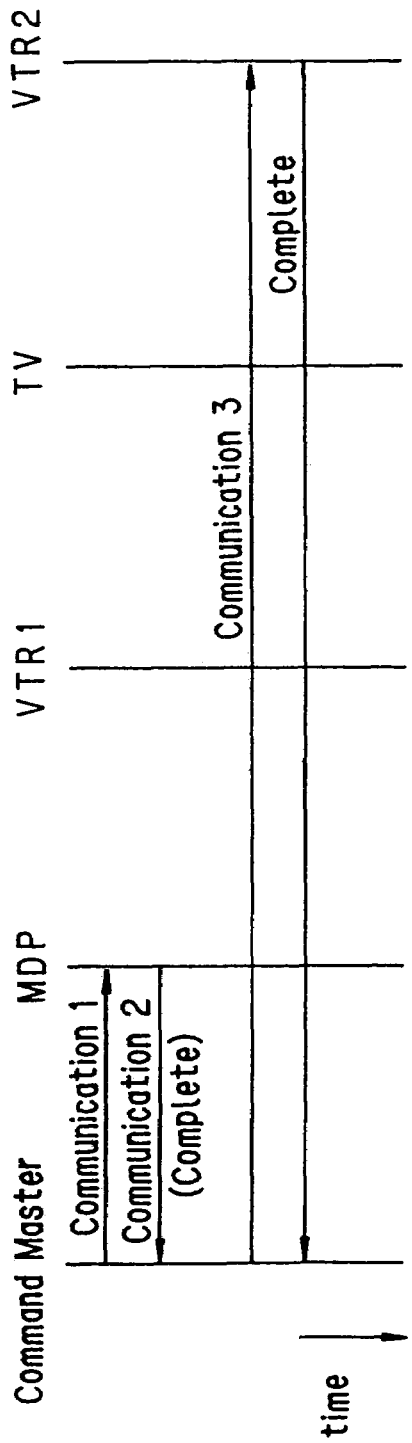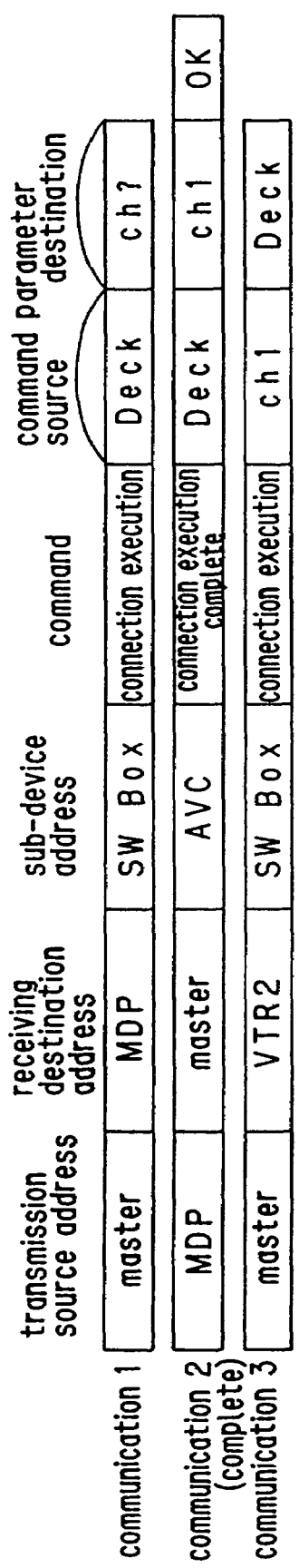

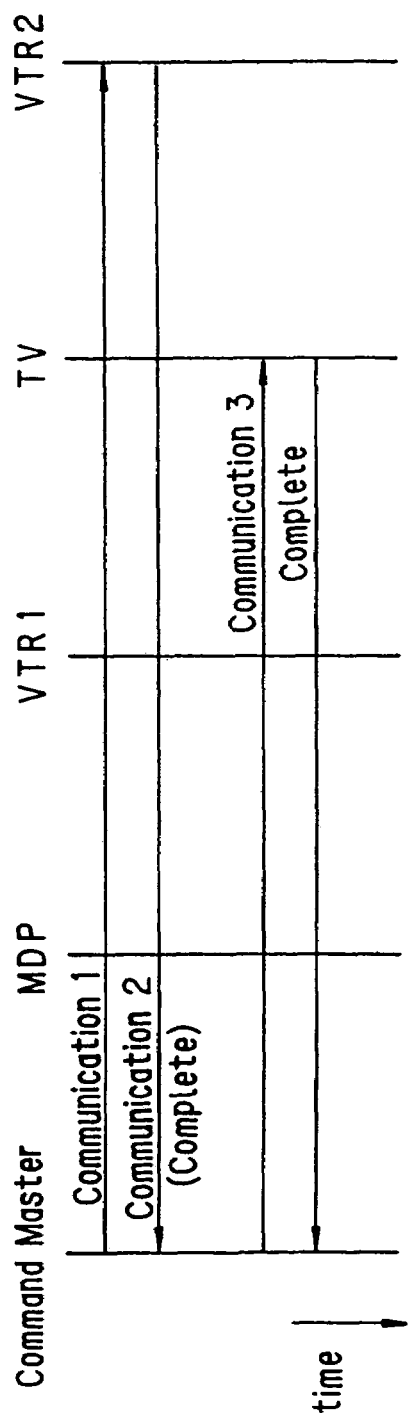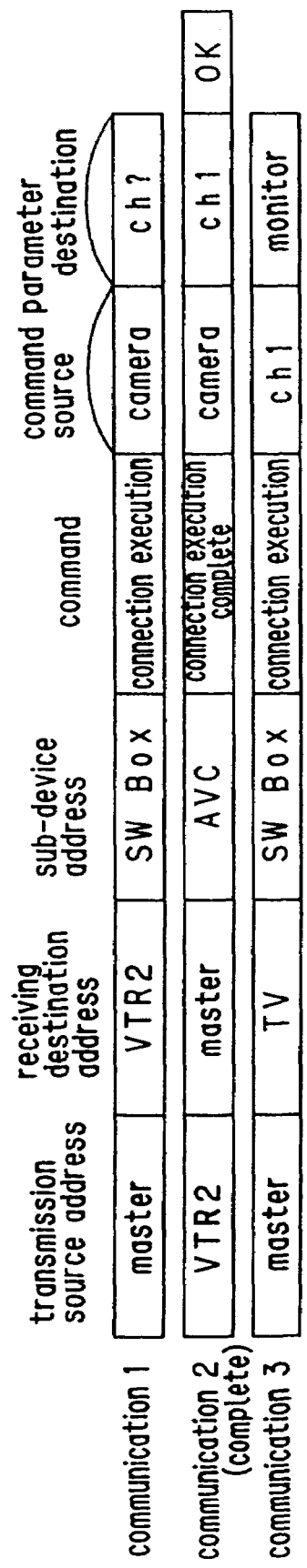

FIG. 12

| address | plug_enable | | 01h | | 02h | | 03h | |
|---|---|---|---|---|---|---|---|---|
| 00h | -- | channel No | -- | PC | | | | Input Plug 1 |
| 04h | -- | channel No | -- | PC | | | | Input Plug 2 |
| 08h | | | | | | | | ... |
| 10h | -- | channel No | -- | PC | DR | -- | Bandwidth | Output Plug 1 |
| 14h | -- | channel No | -- | PC | DR | -- | Bandwidth | Output Plug 2 |
| 18h | | | | | | | | ... |

COMMUNICATIONS SYSTEM

Continuation of prior application Ser. No. 08/738,465, filed Oct. 24, 1996, now U.S. Pat. No. 6,584,099 which is a continuation of application Ser. No. 08/354,119 filed Dec. 6, 1994 now abandoned.

BACKGROUND OF THE INVENTION

1. Field of the Invention

The present invention relates to a way of structuring input/output plugs and a digital interface for equipment in a communications system where a number of equipment are capable of multiplexing and transferring packets of control signals and information signals via a bus.

2. Description of the Related Art

In conventional communication systems where AV (Audio/Video) equipment such as, for example, Video Tape Recorders (hereinafter referred to as VTRs), Televisions (hereinafter referred to as TVs) etc. are connected together via analog AV signal lines and digital control signal lines, a D2B (Domestic Digital Bus) has been used. Examples of this kind of system are described in the European patents that belong to the same applicant relating to this kind of communications system.

First, a description will be given of an example of this kind of communications system with reference to FIG. 17. This communications system comprises a TV, a VTR 1, a VTR 2, a Multi Disc Player (hereinafter referred to as an MDP), and an editor. The VTR 2 is also connected to a device, which is not compliant with a digital control signal line (hereinafter referred to as a non-bus compliant device).

The AV signal input/output plug for the non-bus compliant device is connected to input/output plugs of other devices via analog AV signal lines, wherein the plugs are marked only with designation numbers P1, P2 and P3, protruding directly out from units known as switchboxes (SW box). Commands such as connection control commands are sent and received by other devices via analog AV signal lines and digital control signal lines, which are connected separately from AV signal lines. Each of the equipment is also comprised of one or more functional units, which in the case of a VTR would be (i) a deck for recording and playing back and (ii) a tuner for selecting the signal to be received, and in the case of a TV, would be (i) a monitor and (ii) an amplifier. There is also an AVC (Audio/Video Controller) for controlling the operation of all of the items of equipment, although this is not shown in the diagrams. In the following description, these functional units may also be referred to as sub-devices.

Control connection can be carried out in two ways in a communications system structured in this way. These two ways, which will be referred to as connection control method 1 and connection control method 2, will be described below in numerical order.

In connection control method 1, information pertaining to the connection structure for each device, i.e. which plug is connected to an opposite equipment and whether plugs are used for input or output, is pre-set by the user. In this way, when the equipment is receiving the connection control command, the sub-device which is to be the AV signal source is connected to an output plug being considered as the destination. Alternatively, a path may be set up within the device between the input plug of the designated number and the appropriate output plug, then a command is transmitted to the device connected to the output plug. The object is then achieved at the point in time when the command reaches the sub-device within the specific device indicated by the destination. At this time, commands are not transmitted via the control signal line when the device is a non-bus compliant device. The plug numbers for devices connected to this kind of device have to be directly specified (for example, in the case in FIG. 17, the input plug P1 for the VTR 2 is specified).

The following is a description with reference to FIG. 18 of the sequence in connection control method 1 when an MDP output is recorded on a VTR 2 as a result of instructions from an editor. FIG. 18(a) shows the communications sequence and FIG. 18(b) shows the commands.

First, the MDP receives a command giving an instruction to connect the deck output to the deck of the VTR 2 from the command master (editor) (communication 1). At this time, none of the output plugs of the MDP are connected to the VTR 2. However, the output plug P3 is connected to the input plug P1 of the VTR 2, so a command is sent to the VTR 1 via a path from the input plug P1 to the switchbox (communication 2).

When the VTR 1 receives this command, none of the output plugs are connected to the VTR 2 but the output plug P3 is connected to the input plug P1 of the TV. A command is sent via a path from the input plug P1 via the switchbox to the TV (communication 3).

When the TV receives this command, it is understood that the output plug P3 is connected to the input plug P2 of the VTR 2 and a command is sent to the VTR 2 from the input plug P2 via the deck (communication 4).

The VTR 2 then receives this command and switches the switchbox connection so as to input from the input plug P2 to the deck. Once the VTR 2 completes the process 4, the TV is notified of the process completion. Upon receiving this notification, the TV gives notification to the VTR 1 that the process 3 is completed. When the VTR 1 then receives the notification, it gives notice to the MDP that the process 2 has been completed. Upon receiving this notification, the MDP gives notice to the command master that the process is completed. These packets are omitted from the diagrams.

Here, an editor has been set up as the command master. However, rather than setting an editor up on the communications system, a structure may be adopted where the MDP and the VTR have command master functions.

In a second connection control method, an equipment being central (in the following, this is an AV center) manages all of the connection information regarding which kinds of equipment are connected together via which numbered ports in which directions. If the AV center receives a command requesting AV signal connection via the digital control signal line, it sends this command via the digital control signal line to the target device. The target device then receives this command and performs the input/output selection. At this time, it is possible to designate the sub-device by category via the initial connection request from the command master (by BS, CS etc. which are more in line with the objectives, rather than by a tuner etc.). However, at the time of a connection request, only designation of its own plug is available because of it is only aware of its own plug structure.

The following is a description with reference to FIG. 19 of the sequence in a connection control method 2 when a TV is taken as an AV center and output from an MDP is recorded by a VTR 2. Here, FIG. 19(a) shows the communications sequence and FIG. 19(b) shows the commands.

First, the TV receives a command from the command master instructing it to connect the MDP deck output to the deck of the VTR 2 (communication 1). The TV then receives this command and sends a command to the MDP to the effect that the output for the deck sub-device is to be outputted from the output plug P3 (communication 2).

If the MDP receives this command, the switchbox is switched so that the deck output is connected to the output plug P3 and notification of the completion of the switching process is then sent to the TV. If the TV then receives this information, a command is sent from the input plug P1 via the output plug P3 to the VTR 1 (communication 3).

If the VTR 1 receives this command, the switchbox is switched so that a connection is made from the input plug P1 to the output plug P3 and notification of completion of the switching process is sent to the TV. If the TV then receives this notification, a command is sent from the input plug P2 to the deck to be inputted to the VTR 2 (communication 4).

Providing the VTR 2 receives this command, the switchbox is switched so as to input from the input plug P2 to the deck. The TV is then notified when the switching process is complete.

If the TV then receives notification of completion from the VTR 2, notification of completion of the connection is sent to the command master.

However, with connection control method 1, the digital control signal line becomes congested as a result of commands being transmitted between the equipment, which neighbor each other. An infinite loop may be formed depending on the settings of the equipment in the connection line. It is also necessary to know the structure of the equipment, which command master intends to control and the structure of the connections among the equipment in the overall system, so as to designate the plug numbers.

Also, in connection control method 2, no matter how simple a connection is made between a plug and the equipment to which the plug is connected, this may not be achieved without a request being made to the AV center. Further, designation can be made using the sub-device category at the time of a connection request, but plug designation can only be achieved for the equipment's own plugs, for which the structure is known.

It is therefore apparent that connection control of a variety of AV signals by holding connection information for input/output-plugs as interfaces with external equipment is not ideal. It is therefore the object of the present invention to provide a communications system capable of resolving these kinds of problems.

SUMMARY OF THE INVENTION

In order to resolve the aforementioned problems, in the present invention, a communications system has a number of equipment having input/output plugs and containing functional units connected via a bus capable of transferring packets containing combinations of control signals and information signals. The input/output plugs for the equipment within the system are then given attributes and handled in the same way as the functional units within the equipment.

Here, the input/output plugs may also be only for inputting and outputting information signals and may not be connected to the bus. Alternatively, the input/output plugs may be bus channels. The equipment within the system may be VTRs, TVs and MDPs etc. In this case, the information signals may be video signals and/or audio signals.

Also, in the present invention, a communications system has a number of equipment, connected via a bus, capable of transferring packets containing combinations of control signals and information signals, where virtual plugs for inputting and outputting information signals are set up at each of the equipment within the system and information signal connections between each of the equipment are made by controlling connections between the plugs. It is preferable to carry out the inputting of the information signals and the outputting of the information signals independently by setting up the virtual plugs separately for input and output.

Further, in this invention, connections made between the equipment using virtual plugs and connections made between functional units for inputting and outputting information signals within the equipment and virtual plugs for the equipment are carried out independently of each other.

Also, the virtual plug may consist of at least plug enable information and an information signal channel number written in a fixed allocation of a storage means such as, for example, a register etc. and inputting and outputting of information signals using written-in channels can be carried out by controlling the plug enable information. In the case of an output plug, the information signal transfer speed and bandwidth are written in and the outputting of the information signal is carried out for the written in channel at the written in transfer speed and bandwidth. Also, an item for preventing the written-in information from being overwritten is set up as it is preferable to provide protection for the connection conditions.

According to the present invention described in detail above, input and output plug numbers for communications are assigned and input and output plugs are handled and categorized in the same way as for sub-devices. In this way, input and output plugs can be designated in the same way as for sub-devices while connection control commands are being configured. As a result, it is not necessary for the command master to be aware of the connection structure of the opposite equipment or the connection configuration for the equipment in the overall system. Equipment can therefore be simply controlled by making a designation using a category. The connection control becomes simple and clear, so that rapid connection control can be achieved while requiring only a small number of communications.

According to the present invention, a control system for making connections between digital plugs is set up. This system is set up independently from a system for making connections between sub-devices within the equipment and digital plugs. In this way, the differential features related to the channel and the bandwidth, which depend on the digital bus are absorbed, and an environment is provided which is the same as being physically connected via an analog signal line. It is therefore possible to interface via a digital plug without using the concept(s) of a digital bus characteristic for existing equipment. This means that interoperability with existing command sets can be maintained. By then setting up the digital plugs within a digital I/F communications IC, digital I/F compliance can be maintained even without a communications control microcomputer. It is therefore possible to make and sell equipment at a low price.

Also, it is no longer necessary to make requests to the AV center, which carries out centralized processing of connection information when transferring commands from one place to the next in the way that was necessary in the prior art.

BRIEF DESCRIPTION OF THE DRAWINGS

FIG. 5 is a view showing the sub-device categorization;

FIG. 6 is a view showing an example of a category, which corresponds to a sub-device number;

FIG. 7 is a view showing sub-device categorization;

FIG. 8 is a view showing an example of a category/address, which corresponds to a plug number;

FIG. 9 is a view showing an example of a category/address compatible with an actual plug number for which the name has been changed to that of the specific opposite equipment to which it is connected;

FIG. 10 is a view showing the connection control when the output from an MDP by using a categorized plug is recorded on a VTR 2;

FIG. 11 is a view showing the connection control when the output from a camera present in a non-bus compliant device connected to the input plug P1 of the VTR 2 by using a categorized plug is displayed on a TV;

FIG. 12 is a view of an example of a digital plug;

DETAILED DESCRIPTION OF THE PREFERRED EMBODIMENTS

Embodiment

The following items are explained in detail with reference to the diagrams:

1. a communications system to which this invention is applicable;
2. a sub-device categorizer;
3. a plug categorizer;
4. a specific example of connection control using a categorized plug;
5. a virtual plug set up,
6. a specific example of connection control using a virtual plug; and
7. an example of equipment equipped with a virtual plug.

1. The Communication System to which this Invention is Applicable.

Figure 1:
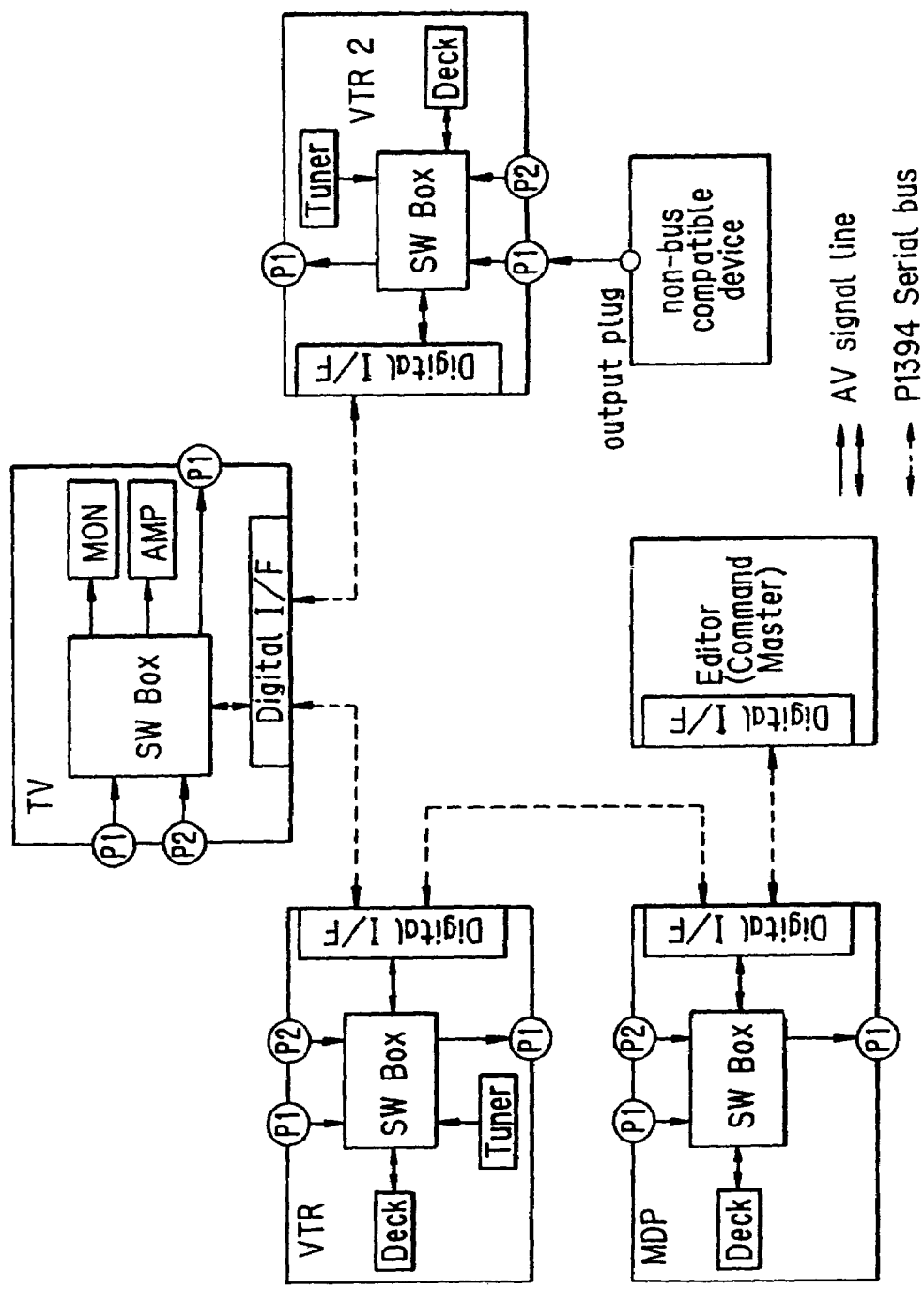
FIG. 1 is a view showing an example of a structure of a communications system to which this invention is applied.

FIG. 1 is a view of an example of a system structure of a communications system to which the present invention is applicable. This communication system comprises an MDP, TV, VTR 1, VTR 2 and editor. Connections are made between MDP and VTR 1, VTR 1 and the TV, the TV and VTR 2, and, the editor, and the MDP using P1394 serial bus. A non-bus compliant device is also connected at the input plug P1 of the VTR 2.

The input plugs and the output plugs for each of the equipment are independently numbered, with a category being assigned internally for each of the equipment. Each plug is arranged on an equal basis with the sub-device with respect to the center of the switchbox. It is common for these input/output plugs to be connected to non-bus compliant devices. Indirect attributes (e.g., analog line input, digital line input) for the plug categories are set in defaults and specific equipment on opposite sides of connections are registered by a user (These will be described in detail later). There are also cases where AV signal lines for the audio signals and video signals within the equipment are independent of each other, but in order to keep the description simple, no distinction will be made in this case. There is also an AVC (Audio Video Control) sub-device present for controlling the whole operation of the equipment, but this is not shown in the diagrams.

Each of the equipment (non-bus compliant equipment excluded) is equipped with a digital interface (hereinafter referred to as digital I/F) for the P1394 serial bus. This digital I/F is a dedicated communications IC for carrying out the transfer of control signals and information signal packets.

Figure 2:
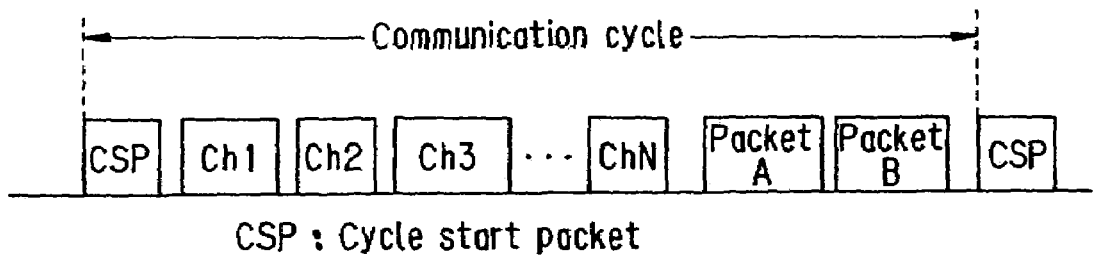
FIG. 2 is a view showing an example of the communications cycle for the communications system in FIG. 1.

At the P1394 serial bus, communication is carried out in prescribed communication cycles (for example, 125 micro seconds), as shown in FIG. 2. The communication of information signals such as compressed digital video signals is carried out continuously at a fixed data rate as isochronous communication, and the communication of control signals such as control commands etc. is carried out non-periodically as asynchronous communication.

There is a cycle start packet (CSP) at the start of the communication cycle, after which the period for transferring the packet is set up to ensure isochronous communication. It is possible to carry out a number of isochronous communications by assigning channel numbers 1, 2, 3, . . . N to the packets for carrying out isochronous communications.

After the transfer of the isochronous communication packets for all of the channels is completed, the period until the next cycle start packet CSP is used for asynchronous communications. The asynchronous communications packet (packets A and B in FIG. 2) has the physical addresses and logical addresses for the transmission equipment and receiving equipment. Each of the equipment then takes in the packet which has its own address attached to it.

The control signals and information signals can therefore be mixed together and transferred at the P1394 serial bus. As a result, it is no longer necessary to be aware of the connection structure while the digital I/F input/output plug for this bus is being handled.

Figure 3:
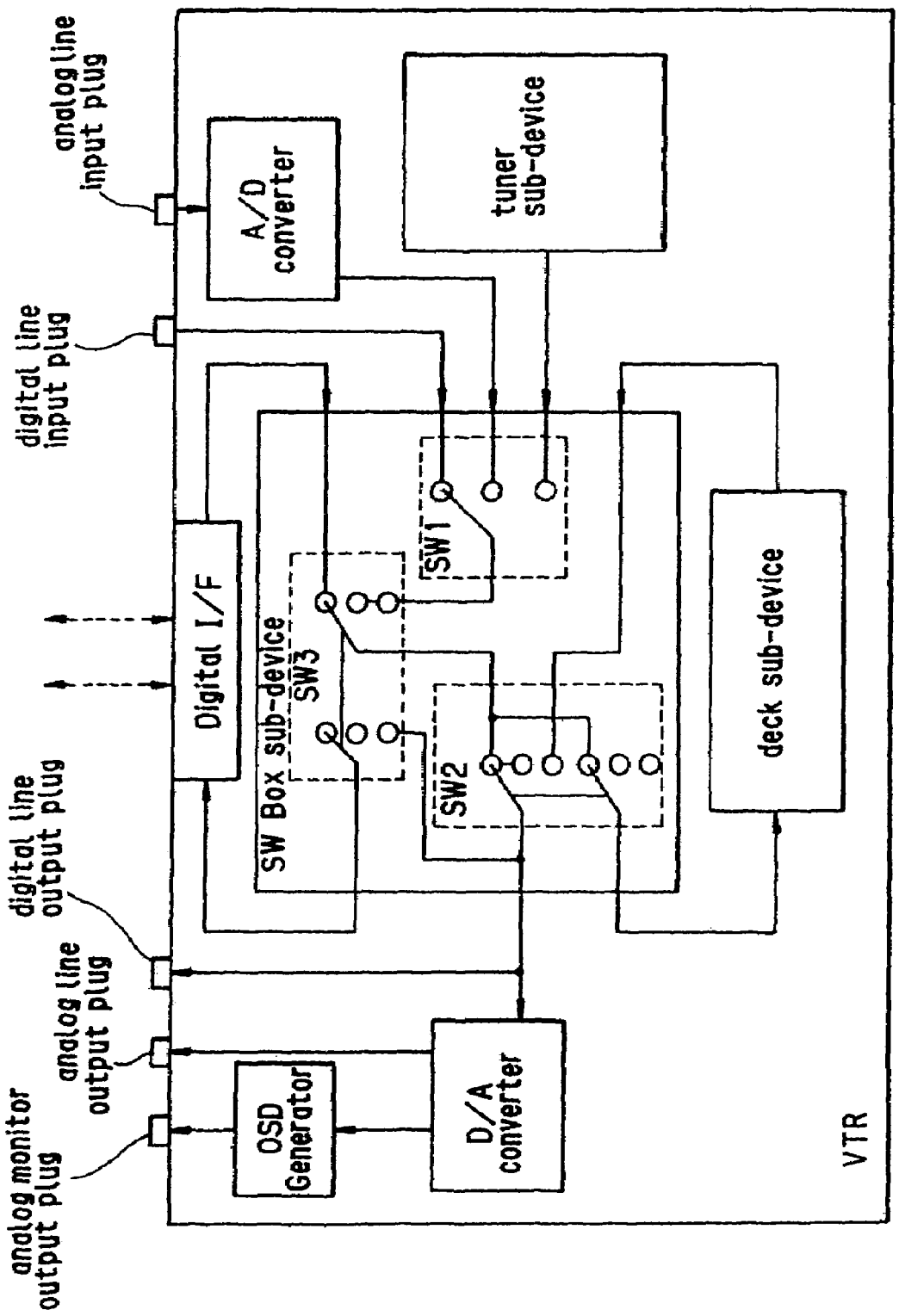
FIG. 3 is an example view showing the internal structure of the VTR in FIG. 1 in more detail.

FIG. 3 shows an example of the details of the internal structure of the VTR 1. The P 1394 serial bus line (hereinafter referred to as the digital bus) represents a bi-directional line consisting of two lines. This may also consist of one line going in just one direction or items consisting of three lines or more, depending on the equipment. Analog A/D converters and/or D/A converters are set up between the analog line input plugs and the analog line output plugs, and the switchboxes. An OSD (on screen display) generator is also connected to the monitor output plug.

Each sub-device and each plug is connected to either or both the AV signal input and output for the switchbox. Switching then can be made using each of the switches SW1 to SW3 within the switchbox. For example, SW1 switches between the digital input plug, analog input plug and tuner sub-device. The switch SW3 then switches between these results and the input from the digital I/F. The switch SW2 is then switched to output either these results, or the play-back input from the deck sub-device, from the switchbox. The switch SW2 also switches and decides whether to output to the deck sub-device at the time of video recording. As this alternates with the input from the deck, this can be expressed as two types of inter-locking switches having three overall positions. It is also possible to switch and decide whether or not to send output to the digital I/F at the switch SW3. As this is alternated with the input from the digital I/F, this can also be expressed by two kinds of inter locking switches having a total of three positions.

Figure 4:
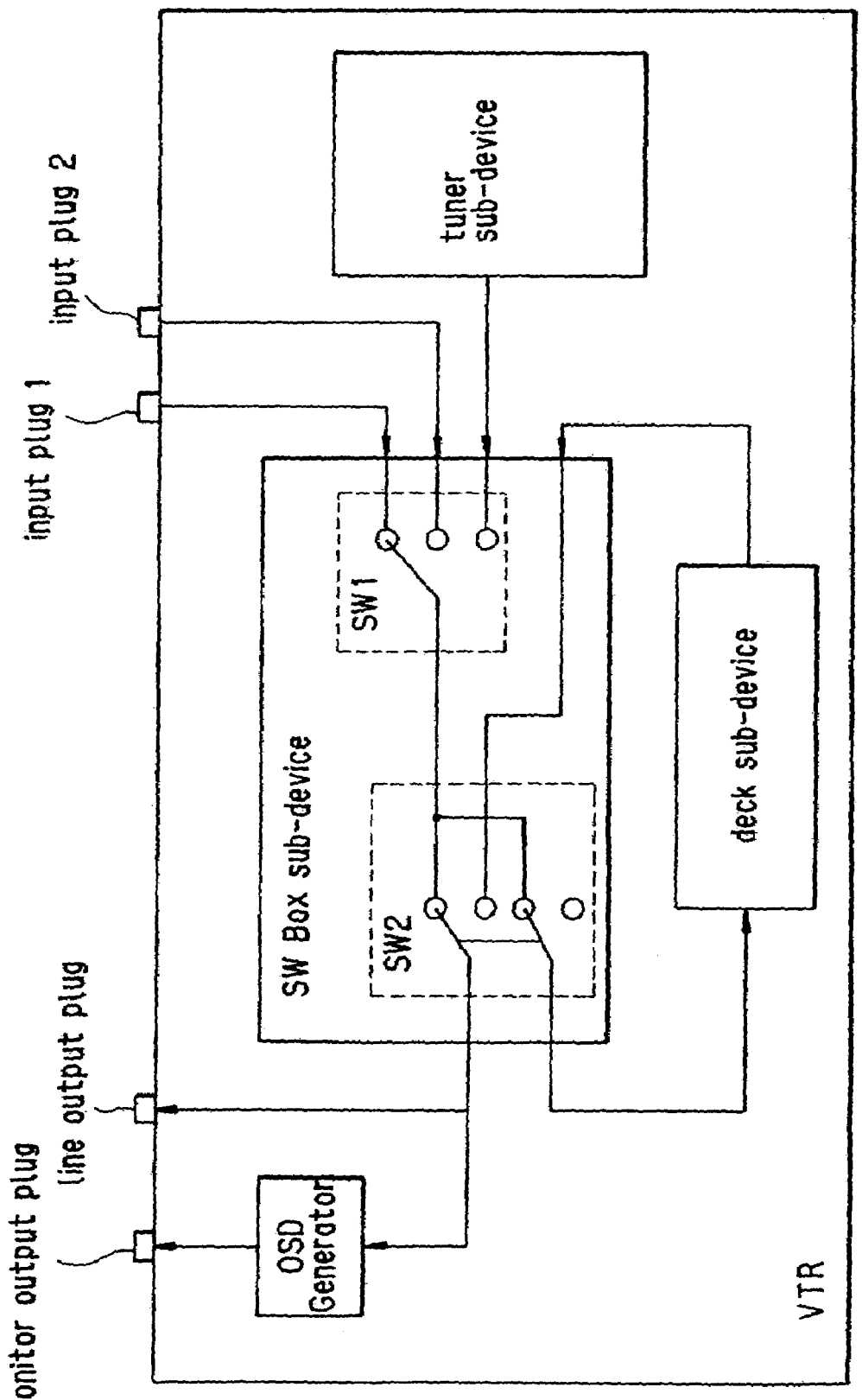
FIG. 4 is a view showing an example of the internal structure of the non-bus compliance device in FIG. 1.

In this way, the plug and the functional unit may be considered equal while describing the internal structure of the equipment, so that inputs and outputs going to the switchbox may be distinctly divided. This method may also be applied to non-bus compliant equipment of the kind shown in FIG. 4.

2. A Sub-Device Categorizer.

FIG. 5 is a view of a sub-device categorizer. The sub-device number and category type are expressed respectively using ten bit data (B9 to B0). In this way, the decks sub-device number and category type for the VTR may be shown.

FIG. 6 shows an example of an actual sub-device number and corresponding category. This diagram shows a double-deck VTR consisting of a VTR deck 1 being a VHS/S-VHS and a VTR deck 2 being a 8 mm/Hi8.

3. A Plug Categorizer.

FIG. 7 is a view showing a plug categorizer. In this invention, the input/output plug and digital bus channel number for each equipment is handled together as a plug and then categorized. The plug number and the category type are expressed respectively as ten bit data (B9 to B0).

Numbers ranging from 1 to 64 may be allotted as the plug numbers for input/output. Also, the input/output plug for the digital bus, i.e. the channel, is selected as one of the channels 1–64 for input/output, while at the same time making a connection in only one direction.

The category type shows the category of the equipment connected to plug numbers 1 to 64. Connection control is then carried out using this category, rather than the plug number (refer to the example in FIG. 11). With regards to the digital channel, a specific logical address for the opposite equipment is stored (TV, VTR etc.). However, "Digital bus CH?" uses the category designation command, "output at arbitrary channel" (refer to the practical example in FIG. 10).

FIG. 8 is a view showing an example of an actual plug number and a corresponding category/address. This diagram shows equipment where plug 1 uses an analog line input and a monitor output, plug 2 uses an analog line input and an analog line output, and plug 3 uses a digital line output.

As can be seen from FIG. 8, when the category is based on the default, this category is expressed by usual plug attributes such as analog input/output and digital line input. However, if the category is based on user settings, the categories can be replaced with those for other specific connected equipment.

This is shown by the example in FIG. 9. This diagram shows equipment where plug 1 is used for a camera input and a monitor output, plug 2 is used for a CD input and a video printer output and plug 3 is used for an audio deck output. A digital bus may also be connected depending on the system specification, and depending on the plug, this can also be considered to be connected to the same equipment. In this case, the address of the opposite equipment on the digital bus is stored.

As described above, with regards to the digital bus, the logical address for a specific opposite equipment is stored. However, as only one channel is used at the same time, it is presented at only one place in the table. When an equipment outputs a plurality of equipment, this channel may exist. This means that a number of logical addresses can be stored at one place. In FIG. 9, the table shows that the TV and the VTR 2 as input channel 2 of a digital bus.

As the plug and the functional unit can be considered to be the same in this invention, the plug can be indirectly indicated using the category while connection control is being carried out by another equipment, and the equipment which receives the commands can make a specific determination with regards to the plug.

4. A Specific Example of Connection Control Using a Categorized Plug.

1. The case where VTR 2 recording occurs with the MDP output. The following is a description with reference to FIG. 10, of the connection control for the case where the MDP output is recorded at the VTR 2. Here, FIG. 10(a) shows the communication sequence and FIG. 10(b) shows the commands.

First, the MDP receives a command from the command master (editor) for outputting the deck output to the digital bus (communication 1). If the MDP outputs the output from the deck to the digital bus, this channel number (here this is channel 1) put on the command is transferred to the command master.

Next, the command master receives the channel number sent from the MDP, and sends a command to input the channel 1 into the deck to the VTR 2 (communication 3). If input is carried out from the channel 1 to the deck, the VTR 2 transmits notification of completion to the command master.

In this embodiment, connection control can then be carried out rapidly by designating the plug using the category "Digital bus channel?".

2. The case where the output from a camera, which is a non-bus compliant equipment and connected to the input plug P1 at the VTR 2 is displayed on a TV.

The following is a description of the connection control when the output from a camera, which is a non-bus compliant equipment and connected to the input plug P1 of the VTR 2 is displayed on a TV. Here, FIG. 11(a) shows the communication sequence and FIG. 11(B) shows the commands.

First, VTR 2 receives a command to output the camera output to the digital bus (communication 1). It is then determined whether the input plug to which the camera is connected is P1. If it has been possible to output this to the digital bus, the outputted channel number is transferred to the command master (communication 2).

The command master receives the channel number (here this is channel 1) sent from the VTR 2 and sends a command to input channel 1 to the monitor to the TV (communication 3). If the TV then inputs from the channel 1 to the monitor, notification of completion is sent to the master.

In contrast to the conventional connection control method 1, in which the analog plug number was directly designated in the present invention it is designated as the indirect category known as, "camera". Also, in the conventional connection control method 2, a connection request could not be made if the plug number for the opposite equipment was not known. However, in this invention, the connection request can be made using the category designation in the way described above.

5. Virtual Plug Set Up.

It is not necessary to have individual physical plugs for the digital bus in the same way as for the analog signal line because in this case compressed digital data is periodically outputted at time division channels. However, the effect of deciding a path from one equipment to a different equipment is the same as if the connection were carried out using an analog signal line. Also, when one item of equipment is handling a number of channels at the same time, it is necessary to be able to distinguish between these channels. Virtual plugs are therefore set up in this embodiment, so that channels can be distinguished when inputting or outputting occurs. Input and output is also set up separately for these virtual plugs in the same way as for analog plugs.

FIG. 12 is a view of an example of a virtual plug in the communications system for this invention. In the following description, the virtual plug will be referred to as the digital plug. Here, the digital plug is a register having a fixed address, with 4 bytes expressing 1 plug. Input plug 1 is represented by the 4 bytes for addresses 00H to 03H, and input plugs 2, 3 and 4, are represented by addresses 04H to 07H, 08H to 0BH and 0CH to 0FH, giving a maximum of 4. Also, output plug 1 is represented by the 4 bytes from addresses 10H to 13H, output plugs 2, 3, and 4 are represented by addresses 14H to 17H, 18H to 1BH and 1CH to 1FH, giving a maximum of 4. The input/output plugs should only be set to the number of plugs, which the equipment can use at any one time. For example, with equipment which can only handle 2 input/output systems at a time, the regions in the diagrams [ . . . ] become empty registers. As the addresses for the input/output plugs of each equipment are then the same, each equipment is aware of the plug addresses for each of the other equipment. Each equipment can therefore read and write to its own plugs or to plugs for other items of equipment in a relatively easy manner.

If the plug enable for the input plug is set to one, the digital I/F receives isochronous communication packets for information signals from the channel set in the channel number field (However, just completing connections with the outside does not change the conditions within equipment such as the condition of the input selector etc., so that inputting may not be actually carried out depending on the conditions within the equipment). Clearing the plug enable for the input plug to 0 will stop the digital I/F from receiving signals. Other fields for the plug are also cleared to 0 at this time. When the signal connector with the transmitting equipment is being protected, the LSB (Least Significant Bit) for the PC (Protect Counter) for the input plug is set to 1 and when there is no protection this is cleared to 0.

If the plug enable for the output plug is set to 1, the digital I/F transmits isochronous communication packets for the information signal to the channel set in the channel number field, at a transfer speed designated in the data rate (DR) field while using the band presented in the Bandwidth field (internal equipment conditions such as the playback output for the VTR etc. do not change simply as a result of the completion of an external connection. Actual outputting is not carried out by simply depending on the conditions within the equipment). If the plug enable for the output plug is cleared to 0, the digital I/F stops transmitting signals. Other fields for the plug are also cleared to 0 at this time. The PC for the output plug is incremented by 1 when the signal connections with the receiving equipment are protected and are decremented by 1 when the protection is deactivated. In this way, equipment making protection requests can be counted.

These plugs can be rewritten by the equipment. It is, however, necessary, when the PC becomes "0," that rewriting should take place in order to ensure protection. The symbols [- -] in each plug are reserved bits.

An environment, which is completely the same as that for the analog plugs can be provided by keeping the digital plugs separate at input/output in this way. Also, connections between digital plugs and internal equipment connections are kept independent.

6. A Specific Example of Connection Control Using a Digital Plug.

Figure 13:
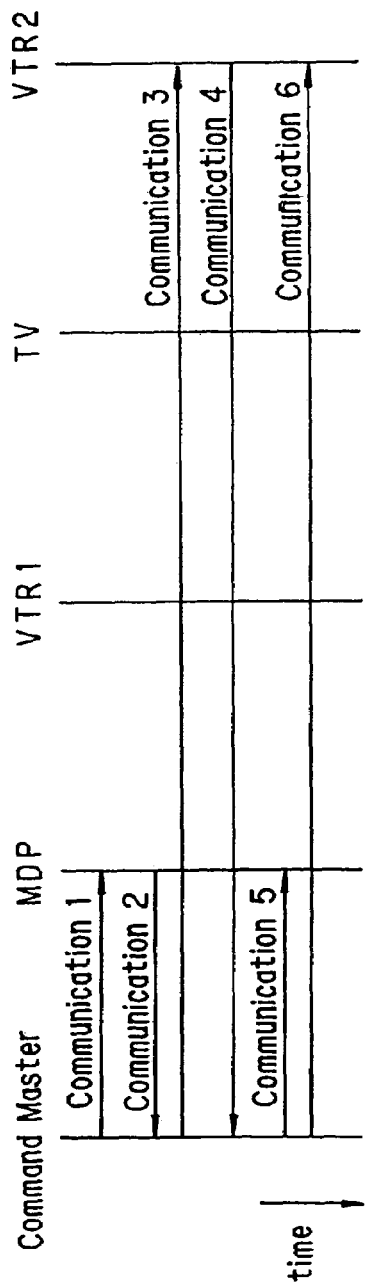
FIG. 13 is a view showing the connection control when the output from an MDP by using a digital plug is recorded on the VTR 2.

The following is a description, with reference to FIG. 13, of connection control when the output from the MDP in FIG. 1 is recorded by the VTR 2. Here, FIG. 13(*a*) shows the communication sequence and FIG. 13(*b*) shows the commands.

First, the MDP receives a command from the command master (editor) to output the deck output to the digital plug (communication 1). If the MDP outputs the deck output to a digital plug, the resulting plug number (here this is plug 1) is transferred to the command master (communication 2).

The VTR 2 then receives a command from the command master to connect the digital plug to the deck (communication 3). If the VTR 2 connects the digital plug to the deck, the resulting plug number (in this case this is digital plug 1) is transferred to the command master (communication 4).

The connection described above between the sub-device within the equipment and the digital plug uses the D2B command without modification. In this way, if the digital plug is known, the command master carries out communications to connect the digital plug with another digital plug. In order to set up the digital plugs for the source equipment and destination equipment, a transaction for writing a channel number, transmission speed and bandwidth is transmitted to the digital output plug 1 of the MDP (communication 5). A further transaction is then transmitted (communication 6), for the writing of the prepared channel number at the digital input plug 1 of the VTR 2.

Here, the communications 5 and 6 are not D2B commands. The transaction known as read-write-lock, for designating the register address and writing the data is provided at P1394. With regards to "command exchange", such as D2B data is written in command registers so as to be exchanged and is achieved by then interpreting the data. On the other hand, communications 5 and 6 utilize the transactions more directly. The instruction, "set up the digital plug" can then be executed by designating the address for the opposite equipment, as well as the digital plug address and then writing in. Also, "find out the input/output status for the digital plug" can be executed by designating the digital plug address and then carrying out the reading operation.

In this embodiment, connections between sub-devices within the equipment and the digital plugs (communications 1 to 4) use the D2B commands, higher layer commands and plug connections between the equipment (communications 5 and 6) by using a digital bus protocol. That is to say, the control system for making connections between digital plugs and the control system for making connections between sub-devices within the equipment and digital plugs are independent.

7. An Example of Equipment Equipped with Digital Plugs.

Figure 14:
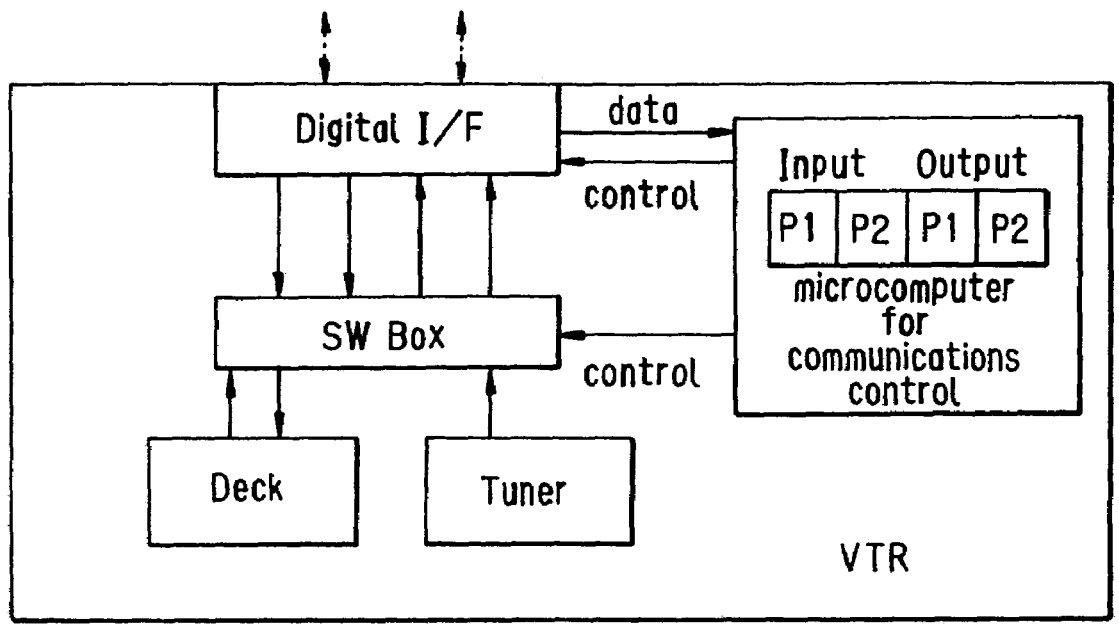
FIG. 14 is a view showing an example of a structure for a VTR equipped with digital plugs.

FIG. 14 is a view showing an example of a structure for a VTR equipped with digital plugs. Here, the digital plugs P1 and P2 for input and output are set up in the RAM area within a communications controlling microcomputer. The communications controlling micro computer (which is equivalent to an AVC sub-device) takes data from the digital I/F and sends a control signal for controlling the digital I/F or the switchbox sub-device so as to activate the designated task. For example, when a transaction of the kind in communication 6 in FIG. 13 going to the digital plug P1 is received, a control signal is sent so as to control the digital I/F so that an information signal from the channel that a channel number is written in is inputted. If the kind of command in communication 3 in FIG. 13 is received, a control signal is sent to control the switchbox sub-device so that the deck sub-device is connected to the digital plug P1.

Figure 15:
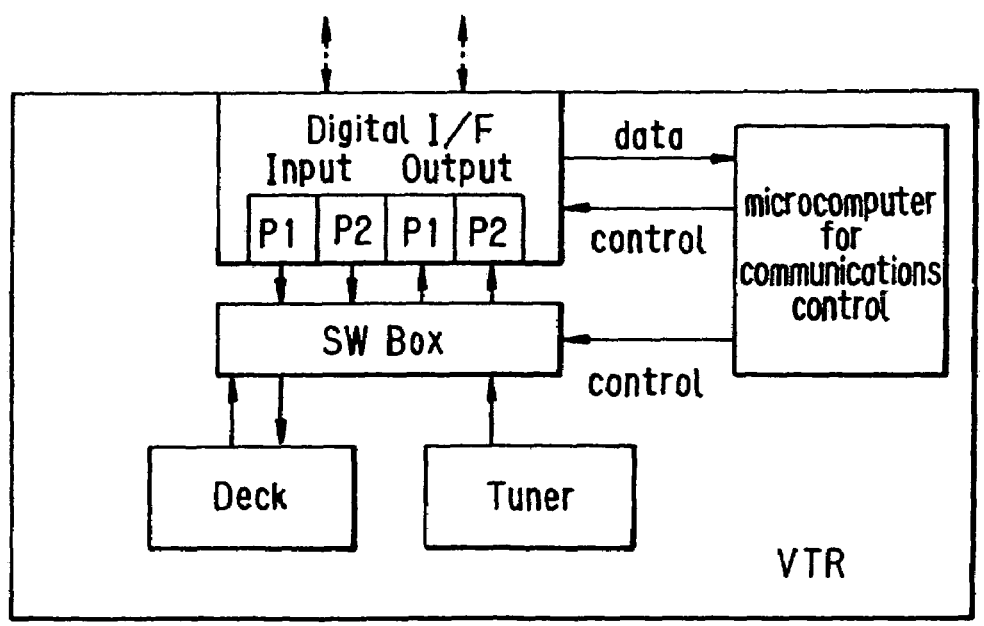
FIG. 15 is a view showing a further example structure of a VTR equipped with digital plugs.

FIG. 15 is a view showing a further example of a structure for a VTR with digital plugs. Here, transactions going to the digital plugs access registers within the digital I/F directly so that the digital plugs P1 and P2 for input and output may actually exist in the register area within the digital I/F. The digital I/F then activates the designated path. The status information of the digital plugs being set up and operating is passed on to the microcomputer for communication control, in the form of data.

Figure 16:
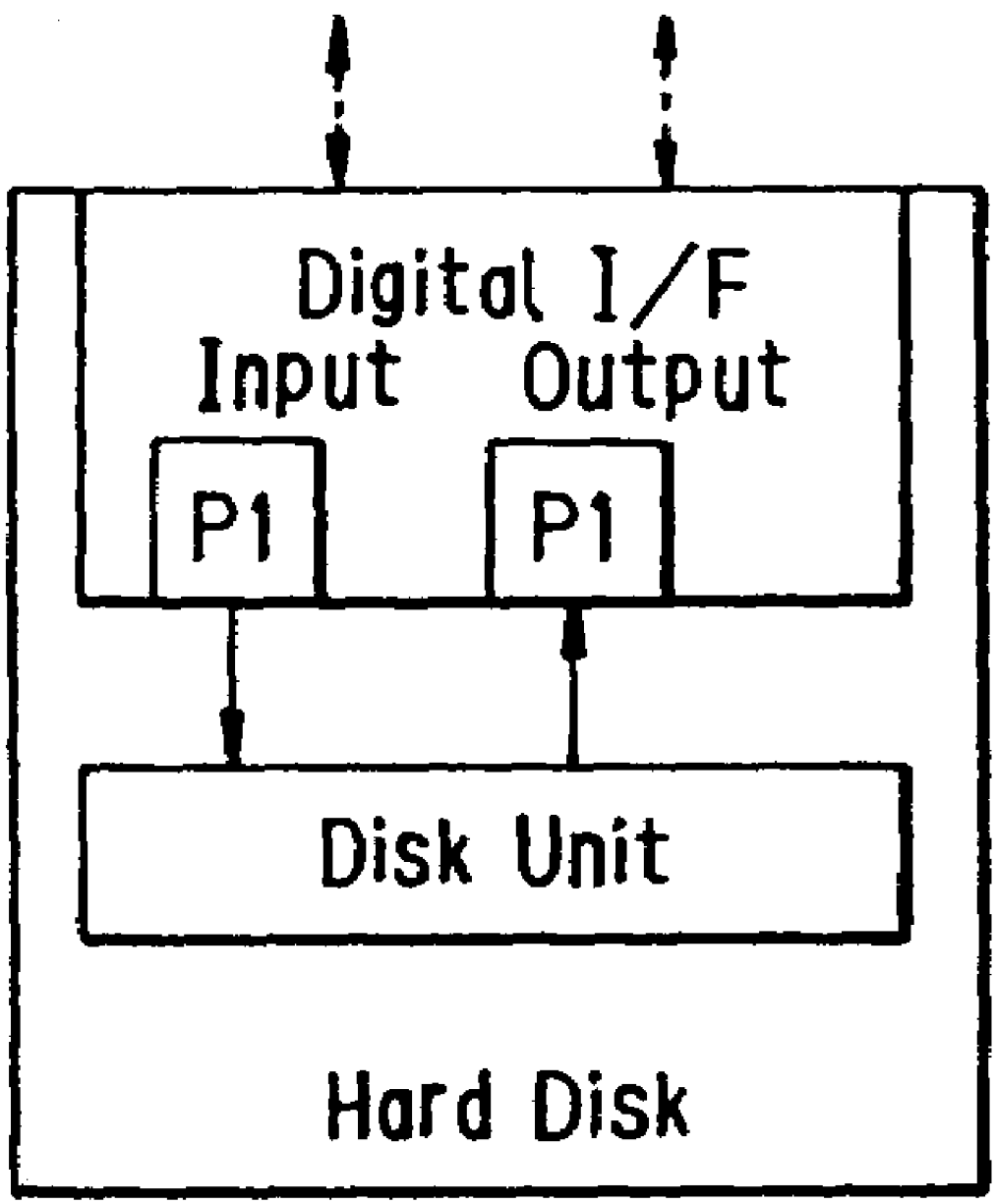
FIG. 16 is a view showing an example hard disc structure for a hard disc apparatus equipped with digital plugs.
Figure 17:
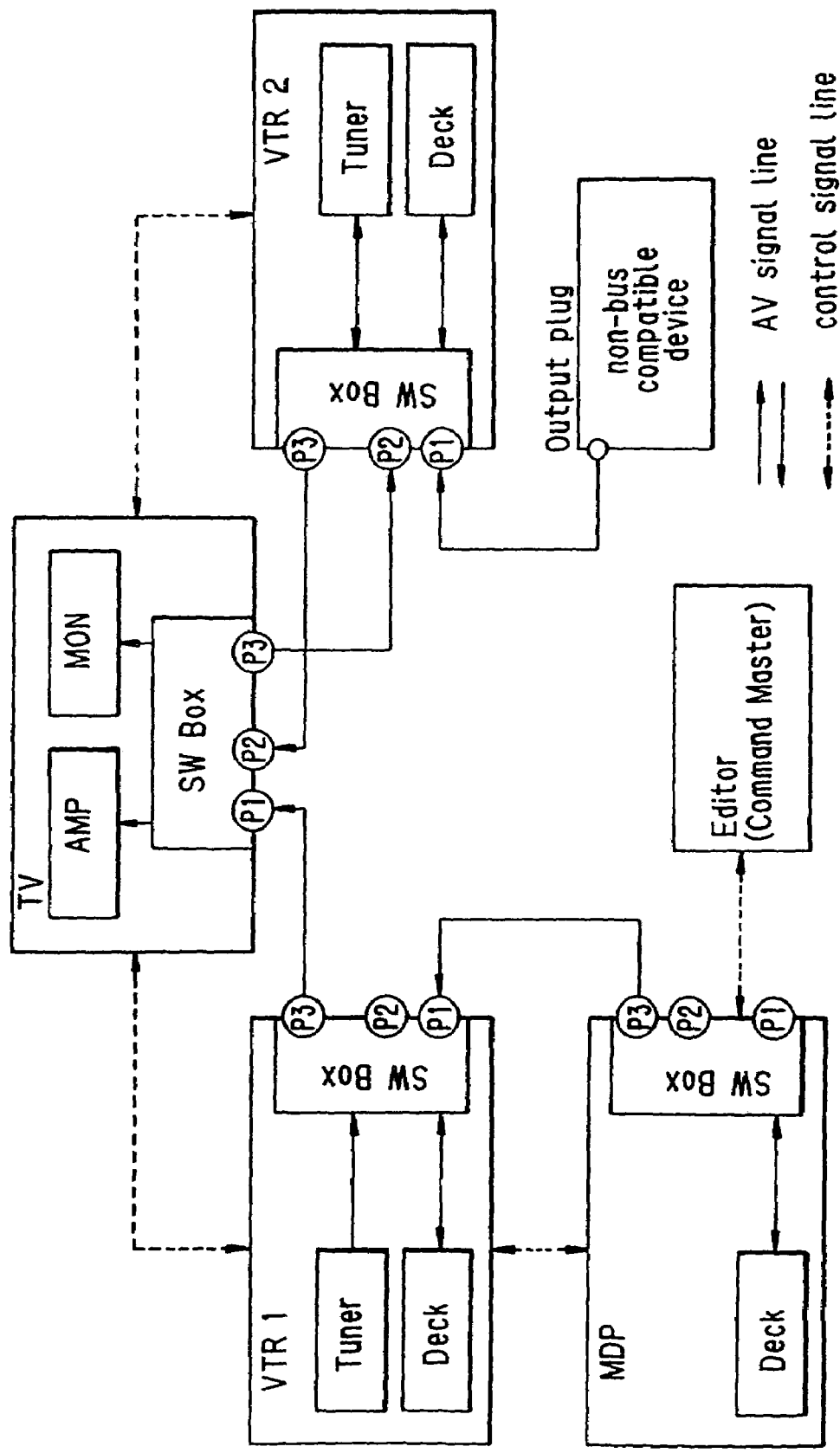
FIG. 17 is a view showing the structure of a communications system where AV equipment is connected by analog signal lines and digital control signal lines.
Figure 18A:
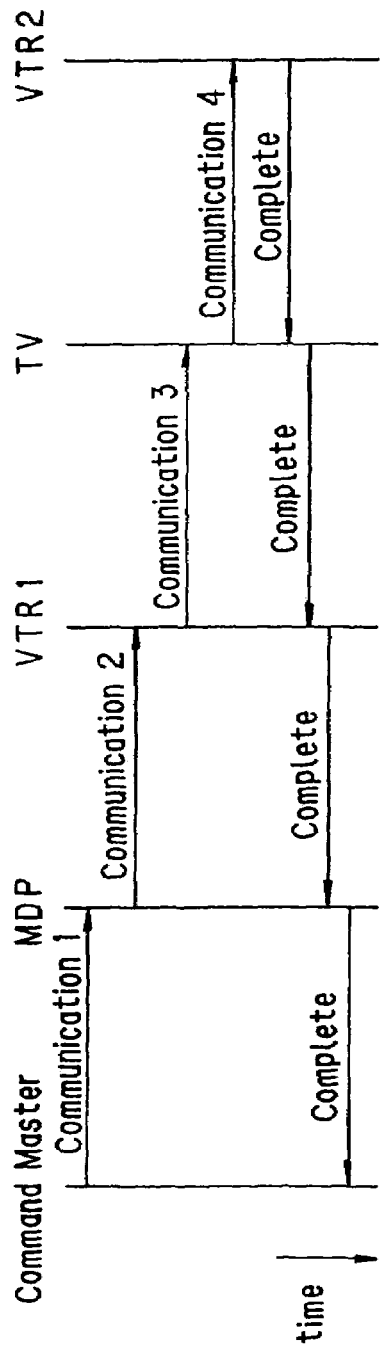
FIG. 18 is a view showing an example of the connection control method for the communications system in FIG. 17.
Figure 18B:
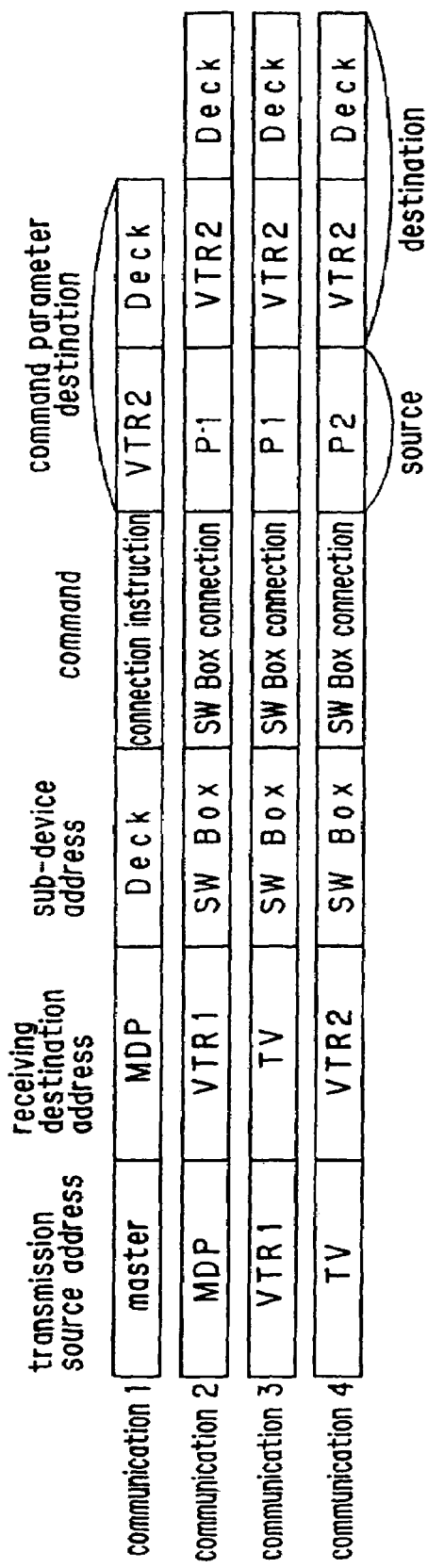
Figure 19A:
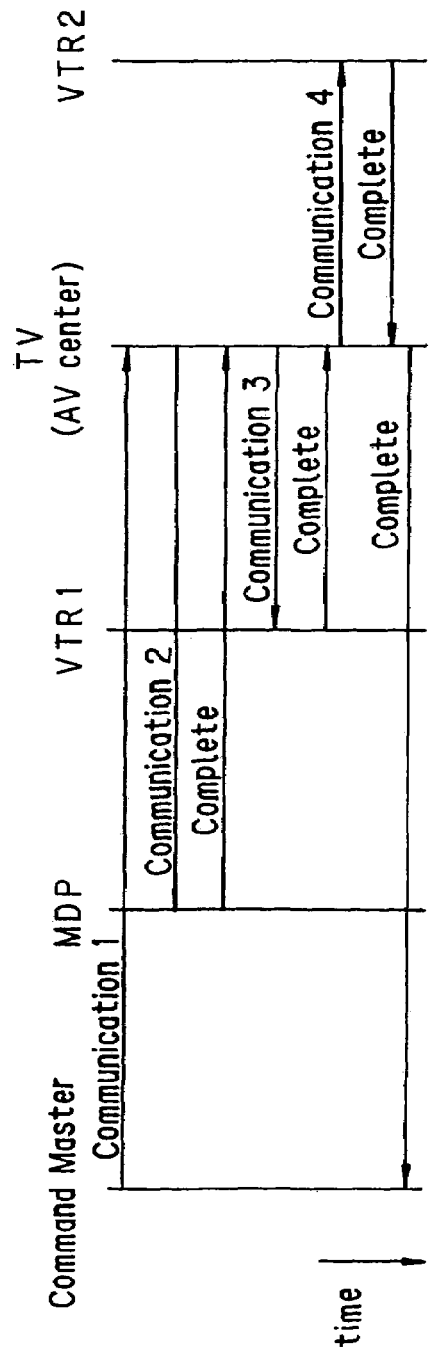
FIG. 19 is a view showing a further example of the connection control method for the communications system in FIG. 17.
Figure 19B:
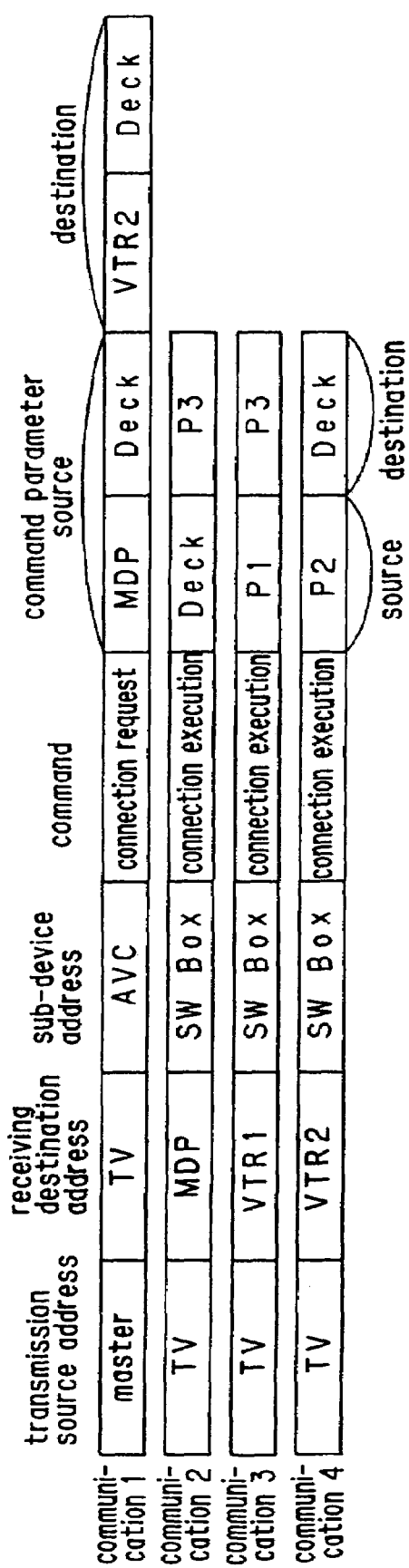

FIG. 16 is a view showing an example structure for a hard disc equipped with digital plugs. Here, the digital plug P1 for the input and for the output are set up within the digital I/F. As the functional unit within the apparatus (sub-device) is a single disc unit, a digital plug for each exists and is always one input/output with the sub-device. Connection control such as D2B etc. is therefore not necessary, and compliance with a digital bus can be achieved even if there is no microcomputer for communications control. It is therefore possible to manufacture low cost equipment.

Also, one input/output plug may be set up for one digital bus channel number. In this way, it is necessary to set up digital plugs for the numbers of channels present in the system and it is no longer necessary to write the channel number at the digital plug.

What is claimed is:

1. A communication method for a communication system in which a plurality of electronic apparatuses are connected via a digital bus configured for transferring isochronous communication packets labeled with channel numbers and asynchronous communication packets in a certain communication cycle, wherein information signals are transmitted on said isochronous communication packets and control signals are transmitted on said asynchronous communication packets, and wherein each of said electronic apparatuses have digital output plugs which output said isochronous communication packets or digital input plugs which input said isochronous communications packets, said method comprising the steps of:

controlling said digital output plugs implemented as registers to which respective addresses are allocated at a transmitting apparatus;

controlling said digital input plugs implemented as registers to which respective addresses are allocated at a receiving apparatus;

using a first counter included in the digital output plug control register at a transmitting apparatus to protect connections with receiving apparatuses; and using a second counter included in the digital input plug control register at a receiving apparatus to protect connections with transmitting apparatuses.

2. The communication method according to claim 1, wherein said registers include information indicating whether or not said information signals can be transmitted or received.

3. The communication method according to claim 1, wherein said registers include information indicating a channel number.

4. The communication method according to claim 1, wherein said registers include information relating to a data rate.

5. The communication method according to claim 1, wherein said registers include information relating to a band.

6. The communication method according to claim 1, wherein said bus is an IEEE 1394 bus.

* * * * *